April 10, 1956 W. K. SQUIRES 2,741,660
TELEVISION INTERCARRIER-SOUND DETECTOR
Filed Sept. 12, 1952
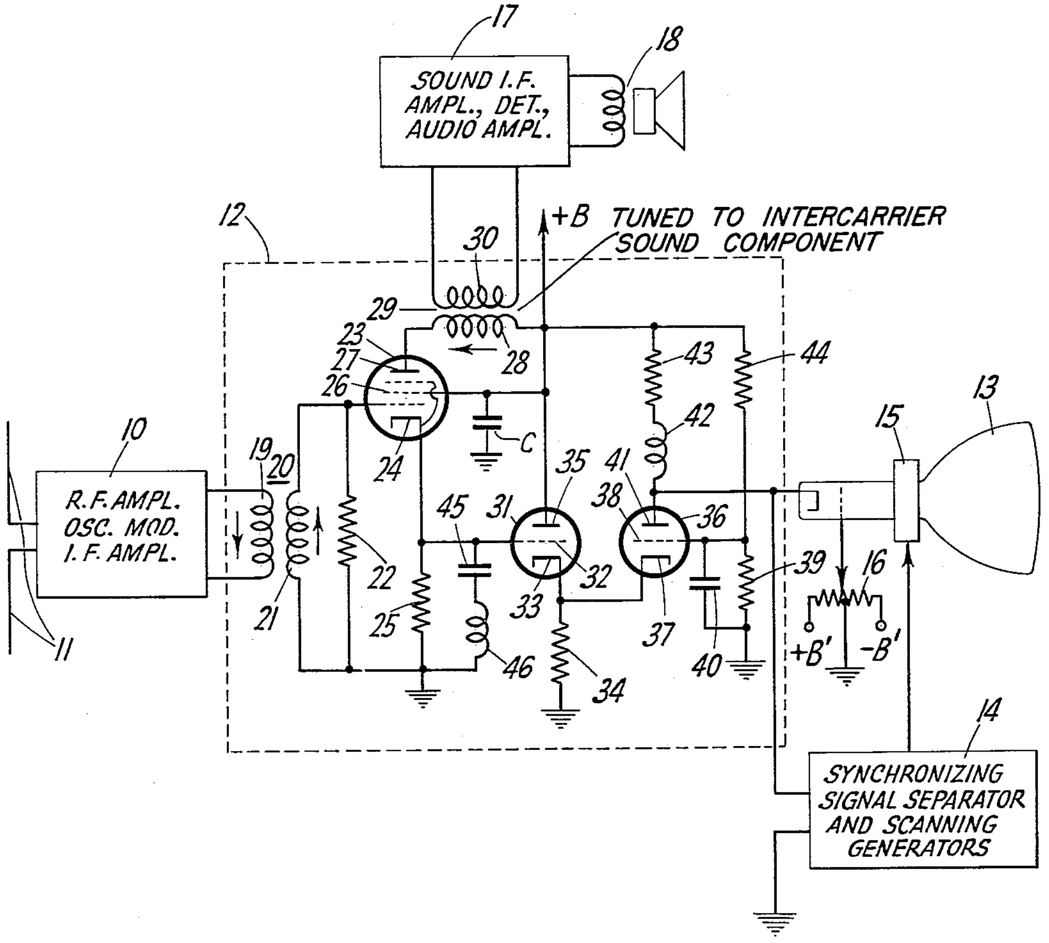
INVENTOR
WILLIAM K. SQUIRES
BY John A. Harvey
ATTORNEY

United States Patent Office 2,741,660

Patented Apr. 10, 1956

2,741,660

TELEVISION INTERCARRIER-SOUND DETECTOR

William K. Squires, Snyder, N. Y., assignor to Sylvania Electric Products Inc., a corporation of Massachusetts Application September 12, 1952, Serial No. 309,205

8 Claims. (Cl. 178—5.8)

The present invention relates to detectors suitable for use as demodulators in television receivers, and particularly to video detectors for use in receivers employing the intercarrier-sound principle.

The video-detector of a television receiver should be a device which, when supplied with a modulated input signal, delivers an output signal which is directly proportional in amplitude to the modulation envelope of the input signal. The detector should possess excellent amplitude linearity for accurate gray-scale rendition in monochrome, and for acceptable color reproduction. In addition, it is desirable not only that the detector transient response be low in overshoot and adequately fast, but that the detector operation not deteriorate the transient response of associated circuits, such as the last intermediate-frequency amplifier stage and the first video amplifier stage. As a matter of efficient receiver design, the detector should produce an output which is as large as possible compared to the input.

One form of video detector heretofore widely used employs a diode rectifier coupled to the last stage of intermediate-frequency amplification and having a diode load impedance across which is coupled the first stage of video-frequency amplification. A circuit series resonant at the frequency of the intercarrier-sound is usually connected in shunt to the diode load impedance for purposes of removing the intercarrier-sound signal from the video signal, and the sound signal is then obtained from this series resonant circuit for application to the sound-carrier amplifier of the receiver. Except at low signal levels, the diode form of video detector has good amplitude linearity and relatively high rectification efficiency. However, it very seriously interacts with associated circuitry. The input impedance is low in magnitude and not a constant, especially when the effect of the first video-amplifier is considered. In particular, the input impedance depends upon the amplitude of the intermediate-frequency signal applied to the detector, and is affected by the predominantly capacitive impedance of the input circuit of the first stage of video amplification which is known to vary with the bias level of the video amplifier. This last-mentioned variation assumes sizable proportions when the video-amplifier grid-plate capacitance variation is large.

The effect of any such input impedance variation on the last intermediate-frequency amplifier stage is to change its frequency and transient response characteristics and to produce poor definition and overshoot in a reproduced picture. In addition to these disadvantages, the diode form of video-detector poses extremely difficult problems when accurate design of detector video peaking circuits is considered. As the driving voltage for the peaking circuits is obtained from a nonlinear source (the detector), it is a ponderous if workable problem to calculate the transient response of such a circuit. As a result, the design formulas for video-detectors of the diode type are usually either highly idealized or highly empirical.

It is an object of the present invention to provide a new and improved television intercarrier-sound detector which avoids one or more of the disadvantages and limitations of prior detectors.

It is a further object of the invention to provide a novel television intercarrier-sound detector characterized by high and substantially constant input impedance over the operating range of input signal amplitudes.

It is an additional object of the invention to provide a novel television intercarrier-sound detector having improved transient characteristics.

It is yet another object of the invention to provide a new and improved television intercarrier-sound detector which provides a frequency-modulated intercarrier-sound signal output higher than heretofore obtainable without specific amplification of this signal external to the detector.

Briefly, the preferred aspect of the invention provides a television receiver detector which has a video signal output load impedance common to both the input and output circuits and a sound-signal output load impedance individual to the output circuit.

Referring to the drawing, the single figure thereof is a circuit diagram, partly schematic, representing a complete monochrome television receiver embodying the present invention. The receiver includes a unit 10, having an input circuit coupled to an antenna 11, which is constituted by one or more stages of radio frequency amplification, an oscillator-modulator for converting a received television signal to an intermediate-frequency television signal, and one or more stages of intermediate frequency amplification. The output circuit of unit 10 is coupled to a television intercarrier-sound detector 12, more fully described hereinafter, which derives the video-frequency modulation components of the intermediate-frequency signal and after amplification applies them to the input electrodes of a picture tube 13 of the cathode-ray tube type. The derived video signal is also applied from the detector 12 to a unit 14 which separates the synchronizing signal components from the video signal and utilizes these components to synchronize the operation of horizontal and vertical scanning-generator systems provided to apply suitable scanning currents to a scanning yoke 15 positioned on the neck of the picture tube 13 in conventional manner. The brightness of the image reproduced by the image reproducing device 13 is adjusted by a brightness control 16 which is coupled to the control electrode of the picture tube 13 and is energized from a source of potential B'. The frequency-modulated intercarrier-sound signal derived by the detector 12 is applied to a unit 17 which may include one or more stages of intercarrier-sound signal amplification, a frequency detector, and one or more stages of audio-frequency amplification. The output of the unit 17 is applied to a sound reproducer 18 in conventional manner. The operation of the television receiver just described is conventional with the exception of the detector 12 presently to be considered more fully, and will not be described in detail.

Referring now to the construction and operation of the detector 12, the output circuit of the last stage of intermediate-frequency amplification in the unit 10 is coupled to the primary winding 19 of a transformer 20 which has a secondary winding 21. The transformer windings 19 and 21 are tunable in conventional manner, as by adjustment of individual powdered-iron cores adjustably positioned within the windings, to the intermediate frequency and the secondary winding 21 has a resistor 22 connected in shunt thereto to broaden the pass-band of the transformer 20. The winding 21 is coupled to the input electrodes of a vacuum tube 23 of the pentode type. The tube 23 has a cathode 24 which is connected through a cathode resistor 25 to ground, a screen electrode 26 which is energized from a source of potential +B, and an anode 27 which is coupled through the primary winding 28 of a sound-signal transformer 29 to the source of potential +B. A by-pass condenser C maintains the screen electrode 26 at ground potential for all frequencies with which the detector is concerned. The transformer 29 has a secondary winding 30 which is coupled to the input circuit of the sound unit 17, one or both of the windings 28 and 30 being tuned in conventional manner to the 4.5 mc. difference frequency existing between the picture-signal and sound-signal carrier frequencies. This 4.5 mc. component is frequency modulated with the sound-signal and is referred to herein as the "intercarrier sound signal." A series connected condenser 45 and inductor 46 are series resonant at the 4.5 mc. intercarrier-sound signal, and are connected in shunt to the resistor 25 to remove this signal from the video signal channel. It may be noted that the input impedance of the detector is of important significance only over the spectrum of frequency components of the intermediate-frequency video signal applied through the transformer 20 to the detector, and is not required to be either high or constant (and in fact is of no importance) at video-signal frequencies. Consequently, any change made in the detector cathode circuit or its impedance which alters the 4.5 mc. input impedance is unimportant.

The resistor 25, with the inherent capacitance to ground of the cathode circuit of tube 23, comprises a video-signal output load impedance common to the input and output circuits of the tube 23, and is coupled to the input electrodes of a cathode-follower video-amplifier stage of amplification. The latter includes a vacuum tube 31 having a control electrode 32 direct coupled to the resistor 25, a cathode 33 which is coupled to ground through a cathode resistor 34, and an anode 35 which is connected to the source of potential +B. The cathode resistor 34 is direct coupled to a cathode-input video amplifier stage which includes a vacuum tube 36 having a cathode 37 directly connected to the cathode 33 of the tube 31, a control electrode 38 which is coupled to ground through a resistor 39 and shunt-connected by-pass condenser 40, and an anode 41 which is connected to the source of potential +B through an inductor 42 and a load resistor 43. The anode 41 of the tube 36 is direct coupled to the cathode of the image reproducing device 13 as indicated.

Considering now the operation of the detector just described, the pentode vacuum tube 23 with its input and output circuits comprises a form of detector having a high and constant input impedance and is commonly referred to as an "infinite impedance" detector. While the term "infinite impedance" is really a misnomer since the input impedance of the detector is not infinite but rather has some finite though high value, the term "infinite impedance detector" will be used for convenience herein in reference to the form of detector arrangement disclosed. The cathode resistor 25 is a video-signal output load impedance common to both the input and output circuits of the detector. In this arrangement, the cathode-to-ground impedance is low in magnitude at the applied intermediate frequencies. The potential of the cathode 24 tends to follow the instantaneous amplitude of the envelope of the intermediate-frequency signal applied to the transformer 20 thus developing across the resistor 25 (due to the non-linearity of the tube 23 in its cutoff region) the modulation components of the applied intermediate-frequency signal. These modulation components constitute the video signal, and are applied through the cathode-follower video amplifier 31 to the cathode input video amplifier 36 for amplification. The amplified video signal is thereafter applied to the image reproducing device 13 for reproduction. The transformer 29 comprises a sound-signal output load impedance shunt resonant at the intercarrier sound signal frequency (4.5 mc.), and this impedance is individual to the output circuit of the tube 23. There is thus developed across the primary winding 28 of the transformer 29 the frequency-modulated intercarrier-sound signal, and this signal is applied by the secondary winding 30 of the transformer to the first intermediate-frequency sound amplifier of the unit 17. The series-resonant circuit 45, 46, which is coupled in shunt to the video load impedance comprised by the cathode resistor 25, removes from the video signal the intercarrier-sound signal to minimize the effect of the latter upon the reproduced image. At the same time, the circuit 45, 46 minimizes any cathode-circuit degenerative action for the 4.5 mc. intercarrier sound signal and thus insures maximum amplitude of output intercarrier sound signal voltage in the anode circuit of the detector.

This detector presents an exceedingly high and constant value of input impedance to the last stage of intermediate-frequency amplification of unit 10 thus improving the amplitude-frequency response and the transient response of such amplifier stage. In addition, it will be apparent that the first video amplifier stage 31 is isolated by the detector from the last intermediate-frequency amplifier stage of the unit 10 so that the video-amplifier also does not materially affect the amplitude-frequency response and transient response of the intermediate-frequency amplifier stage. Thus the design of the intermediate-frequency amplifier, the video detector, and video amplifiers are greatly simplified.

There is the further advantage in a detector embodying the invention that over the normal operating region of the detector, its output circuit is of sufficiently low impedance that even with a video-amplifier having high input capacitance excellent transient response can be obtained without recourse to any peaking circuits as are required with the diode type of video detector. Elimination of the peaking circuits heretofore conventionally employed in the video detector and video amplifier has been found noticeably to improve the transient response of the video channel.

Effective noise limiting is obtained in the cathode-input video amplifier 36, thus minimizing the effect of noise disturbances on the operation of the scanning systems of unit 14.

A detector embodying the invention has the further advantage that it is possible to obtain considerable intercarrier-sound gain in the detector circuit by virtue of the amplification characteristic of the detector tube 23. Also, the detector arrangement of the present invention avoids some of the complications involved in inserting satisfactory sound take-off circuits in the detector or video amplifier stages.

Lastly, there is the important advantage that the detector of the present invention exhibits such delay action that no detector output is produced until the intermediate-frequency signal applied to the detector exceeds a predetermined threshold amplitude. As a result of this characteristic, there is no disturbing sound output of noise and the like while tuning the receiver between transmission channels.

As illustrative of a specific embodiment of the invention, the following circuit constants are given for an embodiment of the type shown in the drawing:

| Name | Number | Value |
|---|---|---|
| Resistor | 25 | 12,000 ohms. |
| Do | 34 | 470 ohms. |
| Do | 39 | 3,300 ohms. |
| Do | 44 | 100,000 ohms. |
| Do | 43 | 6,800 ohms. |
| Condenser | 40 | 0.1 microfarad. |
| Inductor | 42 | 174 microhenrys. |
| Tube | 23 | Type 6AU6. |
| +B | | 180 volts. |
| Rise Time | | 0.09 microsecond, 10% overshoot. |
| Resolution (6 megacycle I. F.) | | 400 lines. |
| Gain (det. cathode to picture tube cathode). | | 14 times. |
| Peak voltage output with excellent linearity. | | 60 volts. |
| Peak output with compression | | 110 volts. |
| Sound output | | 3 times larger than sound take-off after video amplification. |

While there have been described what are at present considered to be the preferred embodiments of the invention, it will be apparent to those skilled in the art that various changes and modifications may be made therein without departing from the invention. Consequently, the appended claims should be interpreted broadly, as may be consistent with the spirit and scope of the invention.

I claim:

1. A television intercarrier-sound detector comprising, an infinite-impedance detector having input and output circuits and a video-signal output load impedance common to said input and output circuits, and a sound-signal output load impedance individual to said output circuit.

2. A television intercarrier-sound detector comprising, an infinite-impedance detector having input and output circuits and a video-signal output load impedance common to said input and output circuits, and a sound-signal output load impedance resonant at the intercarrier sound-signal frequency and individual to said output circuit.

3. A television intercarrier-sound detector comprising, an infinite-impedance detector having input and output circuits and a video-signal output load impedance common to said input and output circuits, and a transformer having primary and secondary windings with said primary winding individual to said output circuit and effectively shunt resonant at the intercarrier sound-signal frequency.

4. A television intercarrier-sound detector comprising, an infinite-impedance detector having input and output circuits and a video-signal output load impedance common to said input and output circuits, a sound-signal output load impedance individual to said output circuit, and a circuit series resonant at the intercarrier sound-signal frequency and coupled in shunt to said video-signal output load impedance.

5. A television intercarrier-sound detector comprising, an infinite-impedance detector having input and output circuits and a video-signal output load impedance common to said input and output circuits, a sound-signal output load impedance individual to said output circuit, and a cathode-follower video repeater coupled to said video-signal load impedance.

6. A television intercarrier-sound detector comprising, an infinite-impedance detector having input and output circuits and a video-signal output load impedance common to said input and output circuits, a sound-signal output load impedance individual to said output circuit, a cathode-follower video repeater coupled to said video-signal load impedance, and a cathode input video amplifier coupled to said cathode-follower video-repeater.

7. A television intercarrier-sound detector comprising, an infinite-impedance detector having input and output circuits and a video-signal output load impedance common to said input and output circuits, a sound-signal output load impedance individual to said output circuit, a cathode-follower video repeater direct coupled to said video-signal load impedance, and a cathode input video-repeater direct coupled to said cathode-follower video-repeater.

8. A television intercarrier-sound detector comprising, an infinite-impedance detector having input and output circuits and a video-signal output load impedance common to said input and output circuits, a sound-signal output load impedance shunt resonant at the intercarrier sound-signal frequency and individual to said output circuit, a circuit series resonant at said intercarrier sound-signal frequency and coupled in shunt to said video-signal output load impedance, and a cathode-follower video-repeater direct coupled to said video-signal load impedance.

References Cited in the file of this patent

UNITED STATES PATENTS

| | | |
|---|---|---|
| 2,498,488 | Fyler | Feb. 21, 1950 |
| 2,642,491 | Cotsworth | June 16, 1953 |